United States Patent [19]

Hanlin

[11] Patent Number: 5,682,916
[45] Date of Patent: Nov. 4, 1997

[54] COOLING TOWER CONDUCTIVITY CONTROL TIMING CIRCUIT

[75] Inventor: Charles E. Hanlin, Fremont, Calif.

[73] Assignee: Advanced Micro Devices Inc., Sunnyvale, Calif.

[21] Appl. No.: 566,387

[22] Filed: Dec. 1, 1995

[51] Int. Cl.⁶ .................................................. F17D 3/00
[52] U.S. Cl. ............................................ 137/1; 137/624.11
[58] Field of Search .................................. 137/1, 624.11, 137/624.13, 624.14

[56] References Cited

U.S. PATENT DOCUMENTS 4,886,090  12/1989  Hays ........................... 137/624.11
5,059,998  10/1991  Sasaki et al. ............... 137/624.11 X

*Primary Examiner*—Kevin Lee
*Attorney, Agent, or Firm*—Townsend and Townsend and Crew LLP

[57] ABSTRACT

A controller having a first timer and a second timer for controlling a duration of a blowdown valve. A coincidence circuit including a second set of timers determines whether an operational overlap interval exists, and properly extends operation of the blowdown valve.

2 Claims, 5 Drawing Sheets

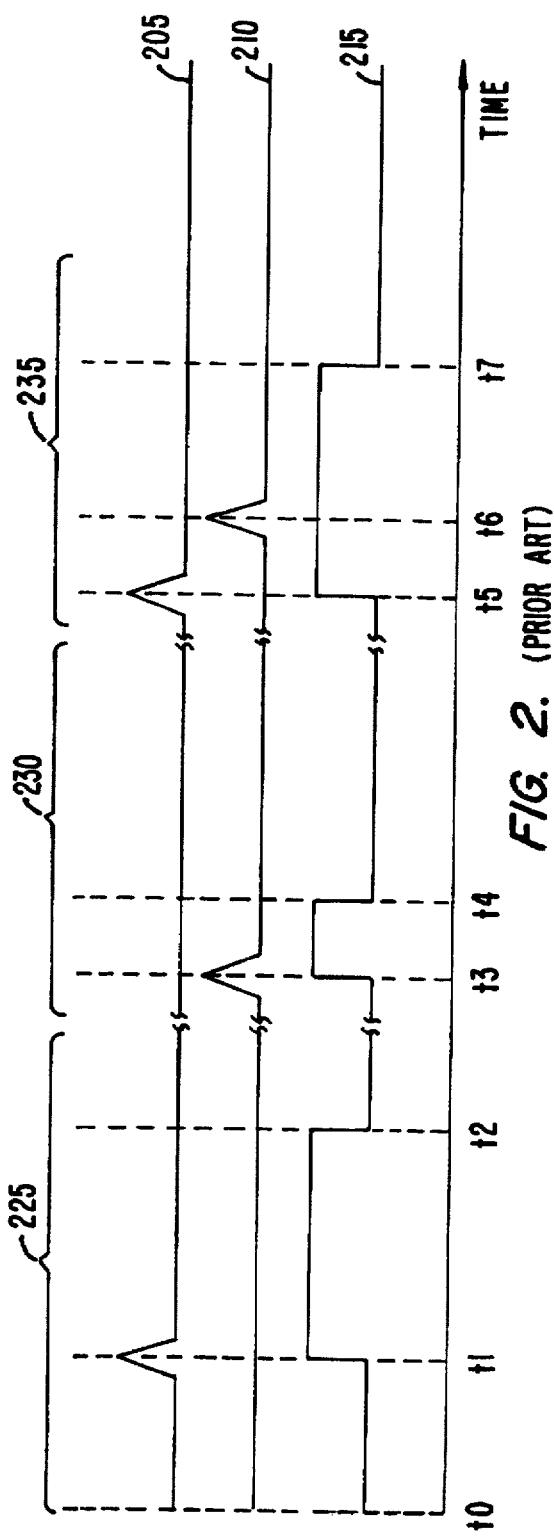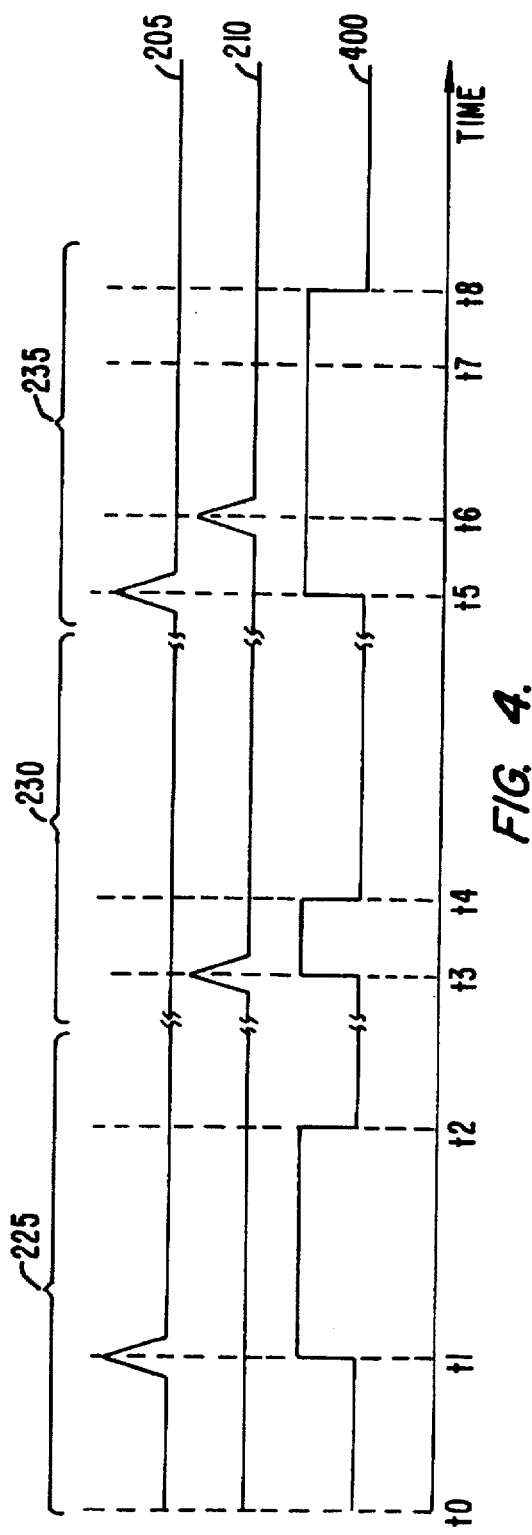

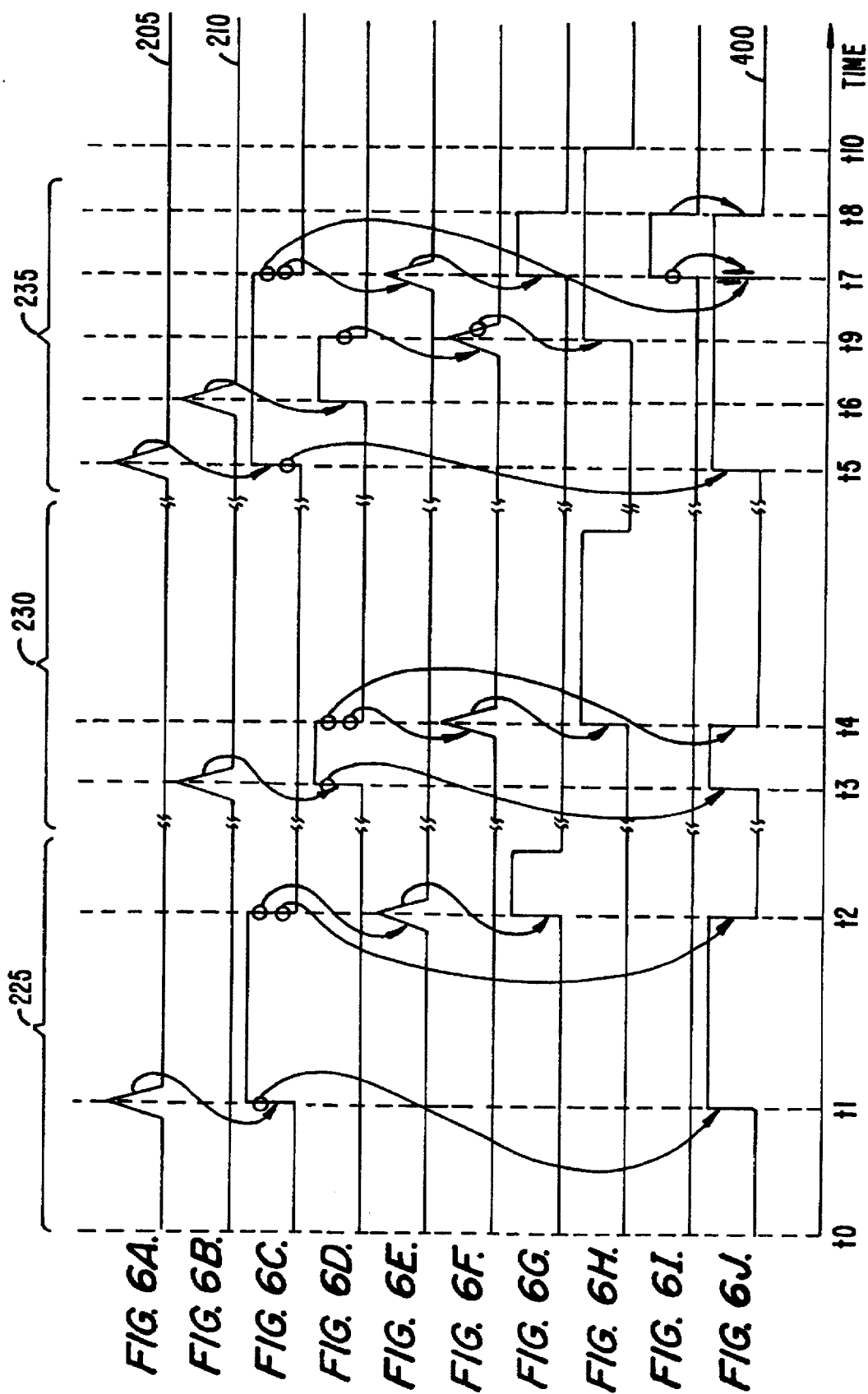

COOLING TOWER CONDUCTIVITY CONTROL TIMING CIRCUIT

BACKGROUND OF THE INVENTION

The present invention relates generally to conductivity control of water in a cooling tower, and more particularly to control of blowdown valve of the cooling system when multiple sources of water are used to replenish water of the cooling tower.

FIG. 1 is a block schematic diagram of conventional cooling tower control system 100. Cooling tower system 100 includes a cooling tower 105 provided with water from a first water source 110 and a second water source 115. A first conduit 120 carries water from first water source 110 to cooling tower 105 and a second conduit 125 carries water from second water source 115 to cooling tower 105. First conduit 120 includes a first valve 130 and a first quantity indicator 135. Second conduit 125 includes a second valve 140 and a second quantity indicator 145. First valve 130 and second valve 140 are responsive, respectively, to control signals from a first valve controller 145 and a second valve controller 150. First quantity indicator 135 and second quantity indicator 145 are each responsive to indicate whenever a first predetermined quantity (for first quantity indicator 135) and a second quantity of water (for second quantity indicator 145) are provided to cooling tower 105. Each quantity indicator asserts a quantity signal whenever the predetermined quantity appropriate for the quantity indicator have been added to the cooling tower.

Much of the water in cooling tower 105 is lost or used, as well understood to persons of ordinary skill in the art, requiring that water be periodically added to cooling tower 105. The water in cooling tower 105 is often required to have particular chemical and electrical characteristics. For example, in some applications, conductivity and pH values of the water in cooling tower 105 are required to be maintained within certain prescribed ranges. To facilitate automatic control of these values, a controller 160 is responsive to the quantity indicator signals to control a chemical treatment system 165 and a blowdown valve 170. Activation of the chemical treatment system 165 results in modification of the pH of the water in cooling tower 105. Similarly, activation of blowdown valve 170 results in release of water in cooling tower 105 into holding pit 175.

As water evaporates from cooling tower 105, its conductivity changes as well-known in the art. This change is typically an increase in the conductivity of the water in cooling tower 105. As water is added from the water sources, the conductivity decreases by a known amount. However, it is often necessary to remove some of the water from cooling tower 105 when adding new water from the water sources. There is predefined relationship between the amount of water added and the amount which must be released using blowdown valve 170 to maintain the water within the desired range. The relationship between the quantity of water discharged through blowdown valve 170 to the quantity of water added is dependent upon many factors that will not be further addressed herein. An important consideration is that this relationship is determinable and depends upon the many factors, including the parameters of the water added.

The issue is further complicated when disparate water sources are used to provide water to cooling tower 105. For example, it is common to have two different water sources supplying water to cooling tower 105. These different sources require different times for activation of blowdown valve 170 for equal quantities of water delivered. For example, one water source may be a city water supply and the other water source may be a well water supply. For the sake of easing explanation, the following relationship will be used: for every two hundred gallons of well water supplied to cooling tower 105, blowdown valve 170 should be activated for three minutes, and for every two hundred gallons of city water supplied to cooling tower 105, blowdown valve 170 should be activated for one minute.

Controller 160 is able to properly respond to quantity indicators as long as the signals are separated in time. Should the quantity indicators assert quantity indication signals too close to each other, controller 160 does not respond properly and activates blowdown 170 for too short of an interval.

FIG. 2 is a timing diagram of blowdown valve control signals of the conventional cooling tower system shown in FIG. 1. Specifically, a signal 205 is an output of first quantity indicator 135, a signal 210 is an output of second quantity indicator 145, and a signal 215 is an output of controller 160 provided to blowdown valve 170. During a first interval 225, signal 205 is asserted at time t1. Controller 160 responds to signal 205 by asserting blowdown valve activation signal 215 from time t1 to time t2. Time t2 minus time t1 corresponds to the activation period for the particular water source. For purposes of this explanation, it is assumed that first water source 110 and second water source 115, both shown in FIG. 1, correspond to the well water supply and to the city water supply, respectively. Thus, first interval 225 has controller 160 asserting blowdown valve activating signal 215 for three minutes (i.e., time t2 minus time t1 equals three minutes).

For a second interval 230, signal 210 is asserted at time t3. Controller 160 responds to signal 210 during second interval 230 by asserting blowdown activation signal 215 from time t3 until time t4. Time t4 minus time t3 corresponds to the activation period appropriate for the city water supply in this example. Thus, second interval 230 has controller 160 asserting blowdown valve activation signal 215 for one minute (i.e., time t4 minus time t3 equals one minute).

For a third interval 235, signal 205 is asserted at time t5 and signal 210 is asserted at time t6. Controller 160 responds to signal 205 and to signal 210 during third interval 235 by asserting blowdown activation signal 215 from time t5 until time t7. Time t7 minus time t5 should correspond to the activation period appropriate for both water supplies in this example. Unfortunately, time t7 minus time t5 is only three minutes. Controller 160 should assert blowdown valve activation signal 215 for four minutes in this example, rather than the three minutes actually experienced. Controller 160 works satisfactorily when only a single water source is used, but fails for more than one water source. It is undesirable to have blowdown valve 170 activated for too short of duration.

SUMMARY OF THE INVENTION

The present invention provides apparatus and method for simply, efficiently and economically retrofitting a cooling tower system for proper operation using two or more water supplies. It is advantageous to provide a system that properly monitors water quantity indicator signals and properly operates an activation signal when indicator signals are closely spaced.

According to one aspect of the invention, it includes a controller for a blowdown valve in a cooling tower system, the cooling tower system having a first water source and a second water source wherein the blowdown valve is operable for a first period for a first predetermined quantity of water from the first water source that is provided to the cooling tower system and operable for a second period for a second predetermined quantity of water from the second water source that is provided to the cooling tower system, the controller including: a first signal conditioner for receipt of a first signal indicating that the blowdown valve should be operated for the first period, the first conditioner providing a first conditioned signal at a first output; a first timer, coupled to the first output and responsive to the first conditioned signal, for asserting a first timing signal for the first period at a second output; a second signal conditioner for receipt of a second signal indicating that the blowdown valve should be operated for the second period, the second conditioner providing a second conditioned signal at a third output; a second timer, coupled to the third output and responsive to the second conditioned signal, for asserting a second timing signal for the second period at a fourth output; a first trailing edge detector, coupled to the second output and responsive to the first timing signal, for asserting a first edge detected signal at a fifth output when the first timing signal transitions from high to low; a third timer, coupled to the fifth output and responsive to the first edge detected signal, for asserting a third timing signal of the second period at a sixth output; a second trailing edge detector, coupled to the fourth output and responsive to the second timing signal, for asserting a second edge detected signal at a seventh output when the second timing signal transitions from high to low; a fourth timer, coupled to the seventh output and responsive to the second edge detected signal, for asserting a fourth timing signal of the first period at an eighth output; a coincidence detector, coupled to the sixth output and to the eighth output and responsive to the third timing signal and to the fourth timing signal, for asserting at a ninth output a coincidence signal whenever both the third timing signal and the fourth timing signals are asserted; and a valve driver, coupled to the second output, the fourth output and to the ninth output and responsive to the first timing signal, to the second timing signal and to the coincidence signal, for asserting a valve actuation signal whenever one of the first timing signal, the second timing signal and the coincidence signal are asserted.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 2 is a timing diagram of blowdown valve control signals of the conventional cooling tower system shown in FIG. 1;

FIG. 4 is a timing diagram of control signals and an actuator signal of the blowdown valve controller shown in FIG. 3;

FIG. 6 is a timing diagram of control signals and blowdown valve actuator signals of the preferred embodiment of the blowdown valve controller shown in FIG. 5.

DESCRIPTION OF THE PREFERRED EMBODIMENT

Figure 3:
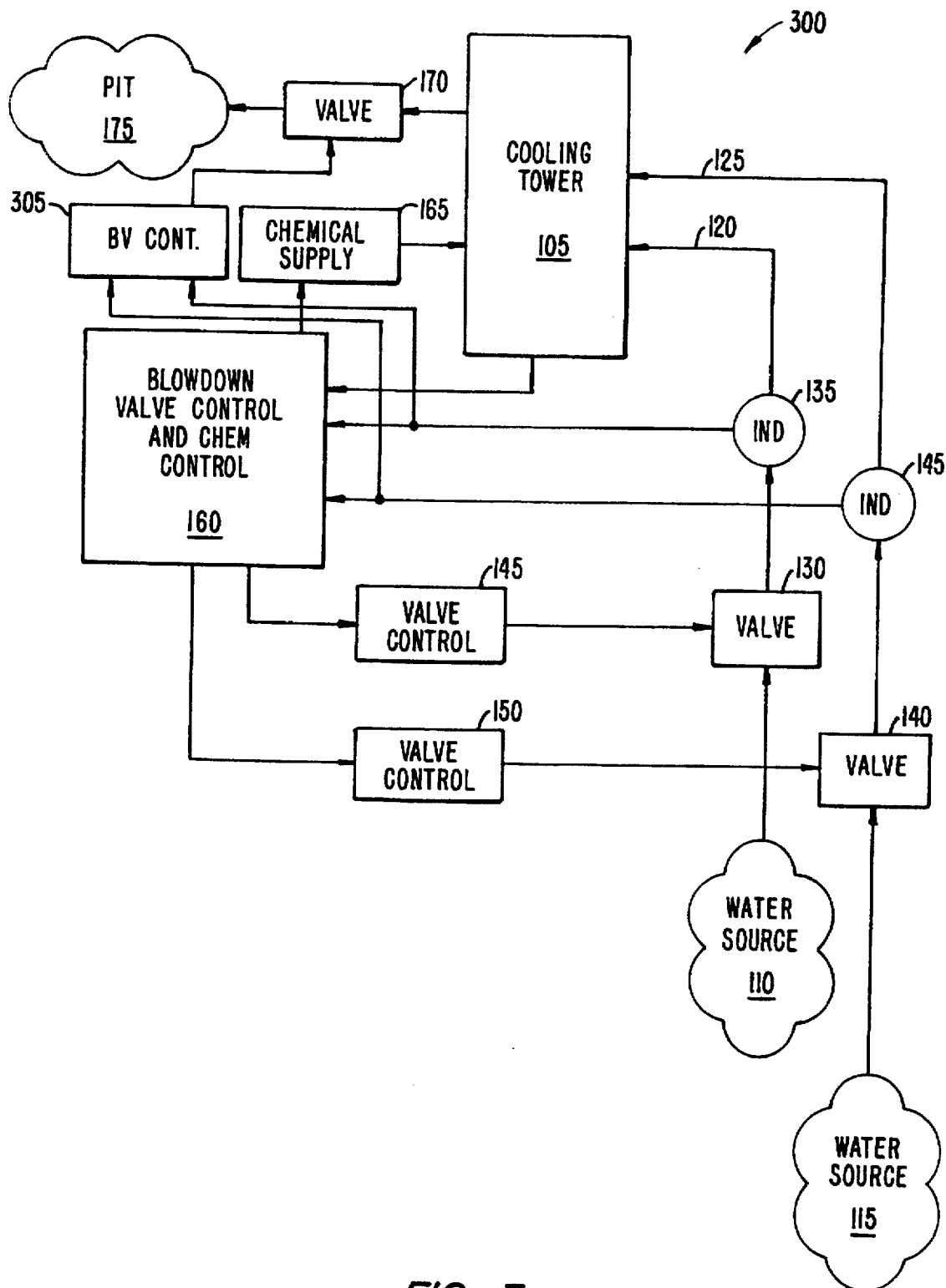
FIG. 3 a block schematic diagram of a cooling tower conductivity control system according to a preferred embodiment of the present invention.

FIG. 3 is a block schematic diagram of a cooling tower conductivity control system 300 according to a preferred embodiment of the present invention. Cooling tower system 300 includes the same operational components as cooling tower system 100 shown in FIG. 1, with cooling system 300 also including a blowdown valve controller 305. Controller 305 includes inputs coupled to first quantity indicator 135 and second quantity indicator 140 to receive the quantity indicator signals. Controller 305 has an output coupled to blowdown valve 170 that replaces the connection of controller 160. Controller 160 no longer controls blowdown valve 170, though it continues to control chemical treatment system 165. Controller 160 still receives the quantity indicator signals from the quantity indicators.

FIG. 4 is a timing diagram of control signals and an actuator signal 400 of the blowdown valve controller 305 shown in FIG. 3. Operation of controller 305 corresponds to the previous description of controller 160 with respect to the FIG. 2 description of first interval 225 and second interval 230. With respect to third interval 235, controller 305 asserts actuator signal 400 from time t5 until time t8, not until time t7 as was the case with controller 160. Time t8 minus time t5 is equal to four minutes, thus blowdown valve 175 (shown in FIG. 170) is operated for the proper duration.

Figure 5:
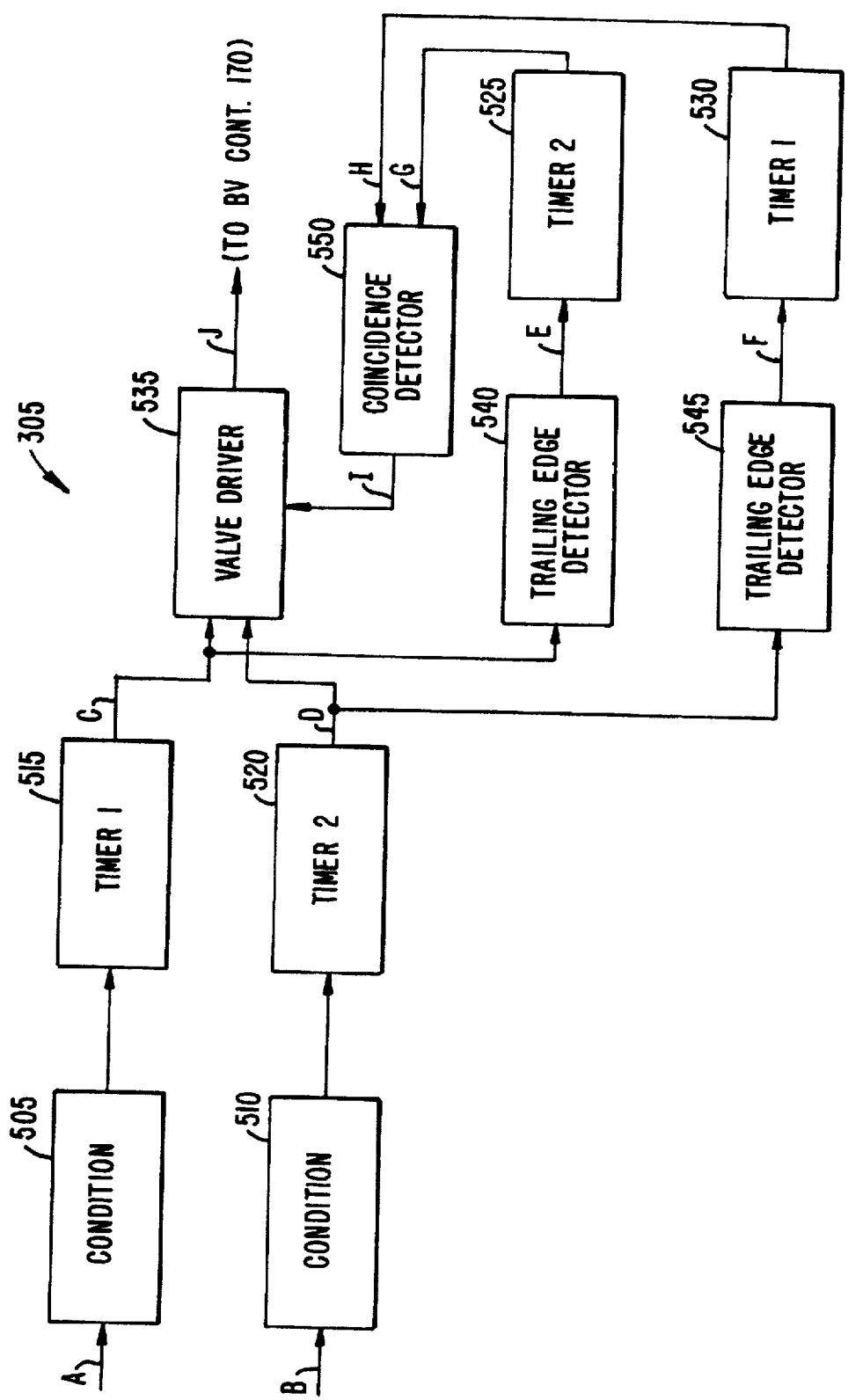
FIG. 5 is a block schematic diagram of a preferred embodiment of a blowdown valve controller shown in FIG. 3.

FIG. 5 is a block schematic diagram of a preferred embodiment of blowdown valve controller 305 shown in FIG. 3. Controller 305 includes a first signal conditioner 505, a second signal conditioner 510, a first timer 515, a second timer 520, a third timer 525, a fourth timer 530, a valve driver 535, a first trailing edge detector 540, a second trailing edge detector 545, and a coincidence detector 550.

First signal conditioner 505 and second signal conditioner 510 of the preferred embodiment receive the first and second quantity indicator signals (first signal 205 and second signal 210 shown in FIG. 4), respectively, from the quantity indicators shown in FIG. 3. These conditioners perform any necessary amplification or waveform shaping necessary or desirable for use by controller 305. In some embodiments, it may not be necessary to condition the input signals. An output of first signal conditioner 505 is coupled to a trigger signal input of first timer 515 and an output of second signal conditioner 510 is coupled to a trigger signal input of second timer 520.

First timer 515, responsive to receipt of a first trigger signal from first signal conditioner 505, asserts a first timing signal for a first predetermined duration following receipt of the first trigger signal. Similarly, second timer 520, responsive to receipt of a second trigger signal from second signal conditioner 510, asserts a second timing signal for a second predetermined duration following receipt of the second trigger signal. The predetermined durations are established depending upon cooling system 300 and water source parameters as discussed above. Using the example previously established, the first predetermined duration is three minutes and the second predetermined duration is one minute. An output of first timer 515 and an output of second timer 520 are each coupled to an input of valve driver 535. Valve driver 535 asserts the valve actuation signal 400 responsive to the state of the first and second timing signals. For example, in the preferred embodiment, valve actuation signal 400 is asserted whenever the first and second timing signals are asserted. When the first and second timing signals are deasserted, valve driver 535 deasserts valve actuation signal 400.

First trailing edge detector 540 also receives, at an input, the first timing signal. First trailing edge detector 540 asserts a first edge-detected signal when said first predetermined interval is over and said first timing signal is deasserted. Similarly, second trailing edge detector 545 also receives, at an input, the second timing signal. Second trailing edge detector 545 asserts a second edge-detected signal when said second predetermined interval is over and said second timing signal is deasserted.

Third timer 525 receives, at a trigger input, the first edge-detected signal from first trailing edge detector 540. Responsive to assertion of the first edge-detected signal, third timer 525, asserts a third timing signal at an output. Third timer 525 asserts the third timing signal for the second predetermined interval (matching the duration of second timer 520) in response to assertion of the first edge-detected signal.

Fourth timer 530 receives, at a trigger input, the second edge-detected signal from second trailing edge detector 545. Responsive to assertion of the second edge-detected signal, fourth timer 530, asserts a fourth timing signal at an output. Fourth timer 530 asserts the fourth timing signal for the first predetermined interval (matching the duration of first timer 515) in response to assertion of the second edge-detected signal.

Coincidence detector 550 receives both the third timing signal and the fourth timing signal. Whenever both the third timing signal and the fourth timing signal are concurrently asserted, coincidence detector 550 asserts a coincidence signal. The coincidence signal is provided to valve driver 535. Valve driver 535 asserts the valve actuation signal whenever the coincidence signal is asserted. Valve driver 535 thus asserts the valve actuation signal 400 whenever any one of the first timing signal, the second timing signal, or the coincidence signal is asserted.

FIG. 6 is a timing diagram 600 of various input signals, control signals and the blowdown valve actuator signal 400 of the preferred embodiment of blowdown valve controller 305 shown in FIG. 5. Timing diagram 600 describes operation of controller 305 with respect to the three intervals (first interval 225, second interval 230 and third interval 235) described above in connection with FIG. 4 and FIG. 2. Timing diagram 600 has labels A–J identifying selected signals in controller 305, and correspond to labels found in FIG. 5. Specifically, label A and label B correspond to first quantity indicator signal 205 and second quantity indicator signal 210, respectively. Label C and label D correspond to the first timing signal and the second timing signal, respectively. Label E and label F correspond to the first edge-detected signal and the second edge-detected signal, respectively. Label G and label H correspond to the third timing signal and the fourth timing signal, respectively. Label I corresponds to the coincidence signal, and label J corresponds to valve actuator signal 400.

During both first interval 225 and second interval 230, no portion of the third timing signal (G) and the fourth timing signal (H) are coincident. It is the coincidence signal that results in properly extending actuator control signal 400 to account for closely spaced quantity indicator signals. Signals labelled E–H develop the coincidence signal I. Valve actuator control signal 400 is influenced by the first timing signal (C), the second timing signal (D), and the coincidence signal (I).

During third interval 235, the mechanism for appropriately extending the duration of the valve actuator control signal 400 comes into play. First quantity indicator signal (A) is asserted at time t5, second quantity indicator signal (B) is asserted at time t6. Assertion of first quantity indicator signal (A) results in initiation of the first timing signal (C) for the first predetermined interval. Assertion of second quantity indicator signal (B) results in initiation of the second timing signal (D) for the second predetermined interval.

Figure 1:
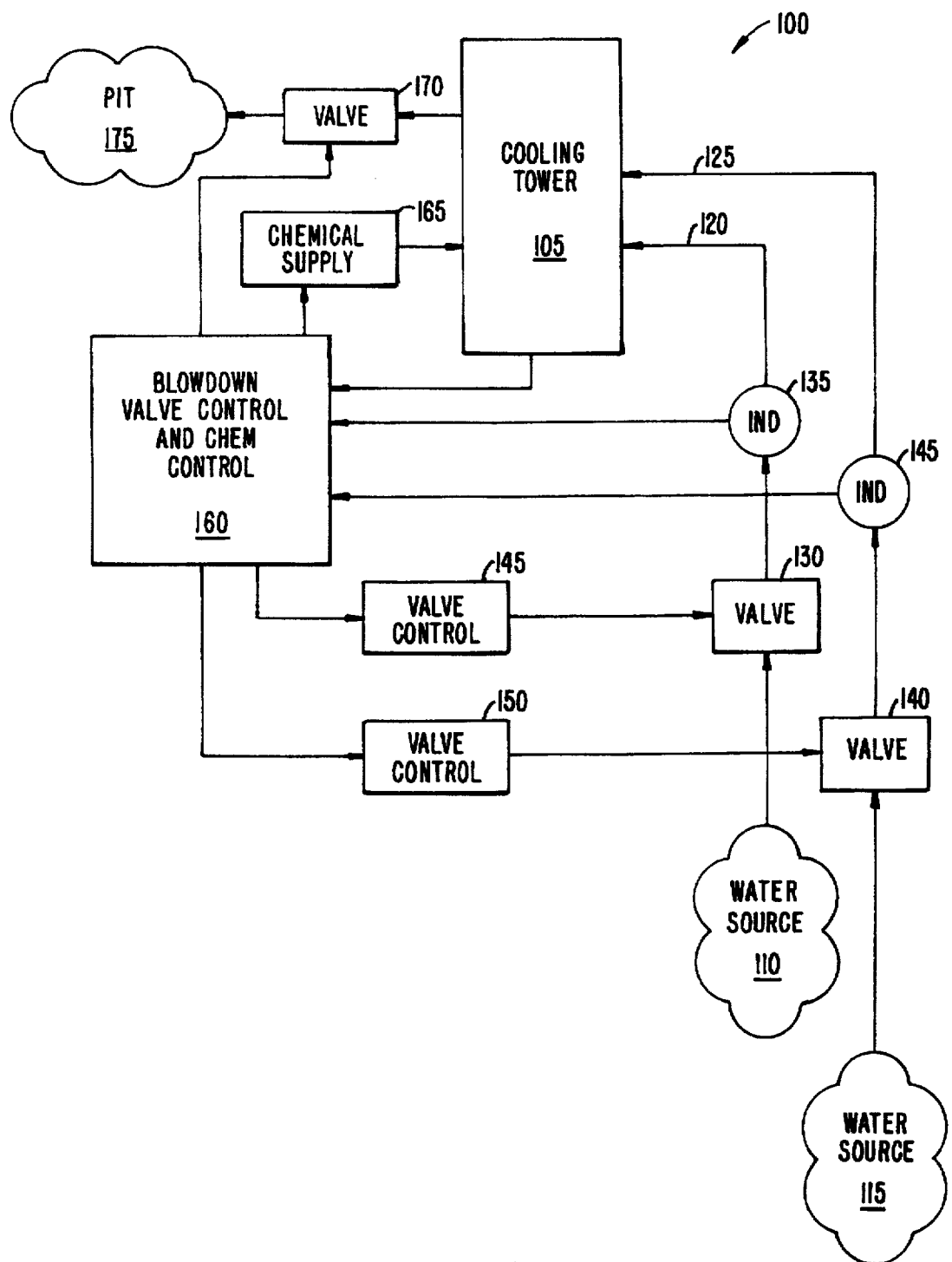
FIG. 1 is a block schematic diagram of conventional cooling tower control system.

The relationship between the first timing signal (C) and the second timing signal (D) during third interval 235 identifies a source of difficulty for controller 160 shown in FIG. 1. Second timing signal (D) is asserted at time t6 and lasts until time t9. Unfortunately, time t9 comes before time t7, the time when the first timing signal deasserts (the first predetermined duration expires). Thus, the assertion of the second timing signal from time t6 to time t9 is ignored by controller 160.

Controller 305 however, includes features to respond to the overlapped first and second timing signals. These features include detection of the trailing edges of the first and second timing signals (indicating expiration of the respective timers) to start secondary timers (third timer 525 and fourth timer 530 shown in FIG. 5) that are used to determine whether an overlap condition of the first and second timing signals occurred.

Upon detecting expiration of second timer 520 (by detecting a trailing edge of second timing signal (D)) at time t9, second trailing edge detector 545 asserts the second edge-detected signal pulse (F) at time t9. Assertion of the second edge-detected signal pulse (F) initiates fourth timer 530 at time t9. At time t9, fourth timer 530 asserts fourth timing signal (H) for the first predetermined interval, from time t9 to a time t10. Time t10 is, in the preferred embodiment, three minutes after time t9.

Upon detecting expiration of first timer 515 (by detecting a trailing edge of first timing signal (C)) at time t7, first trailing edge detector 540 asserts the first edge-detected signal pulse (E) at time t7. Assertion of the first edge-detected signal pulse (E) initiates third timer 525 at time t7. At time t7, third timer 525 asserts third timing signal (G) for the second predetermined interval, from time t7 to time tS. Time t8 is, in the preferred embodiment, one minute after time t7.

Thus, the third timing signal (G) is asserted from time t7 to time t8, and the fourth timing signal (H) is asserted from time t9 to time t10. Coincidence detector 550 (shown in FIG. 5) asserts the coincidence signal (I) during any period in which both the third timing signal and the fourth timing signal are asserted. In the present example, the coincidence signal (I) is asserted from time t7 to time t8.

Valve driver 535 (shown in FIG. 5) responds to the first timing signal (C), the second timing signal (D), and to the coincidence signal (I). Anytime one of these signals are asserted, valve driver 535 actuates the valve control signal (J). Thus, the first timing signal (C) causes valve driver 535 to assert the actuator signal (J) from time t5 to time t7, and the coincidence signal (I) causes valve driver 535 to assert the valve control signal (J) from time t7 to time t8. Consequently, blowdown valve 170 is operated for four minutes, as expected.

In conclusion, the present invention provides a simple, efficient solution to a problem of properly controlling a blowdown valve. While the above is a complete description of the preferred embodiments of the invention, various alternatives, modifications, and equivalents may be used. In other applications, it may be necessary to control a response dependent upon two overlapping intervals. In these applications, the present invention may be applicable. Therefore, the above description should not be taken as limiting the scope of the invention which is defined by the appended claims.

What is claimed is:

1. A controller for a blowdown valve in a cooling tower system, the cooling tower system having a first water source and a second water source wherein the blowdown valve is operable for a first period for a first predetermined quantity of water from the first water source that is provided to the cooling tower system and operable for a second period for a second predetermined quantity of water from the second water source that is provided to the cooling tower system, the controller comprising:

a first signal conditioner for receipt of a first signal indicating that the blowdown valve should be operated for the first period, said first conditioner providing a first conditioned signal at a first output;

a first timer, coupled to said first output and responsive to said first conditioned signal, for asserting a first timing signal for the first period at a second output;

a second signal conditioner for receipt of a second signal indicating that the blowdown valve should be operated for the second period, said second conditioner providing a second conditioned signal at a third output;

a second timer, coupled to said third output and responsive to said second conditioned signal, for asserting a second timing signal for the second period at a fourth output;

a first trailing edge detector, coupled to said second output and responsive to said first timing signal, for asserting a first edge detected signal at a fifth output when said first timing signal transitions from high to low;

a third timer, coupled to said fifth output and responsive to said first edge detected signal, for asserting a third timing signal of the second period at a sixth output;

a second trailing edge detector, coupled to said fourth output and responsive to said second timing signal, for asserting a second edge detected signal at a seventh output when said second timing signal transitions from high to low;

a fourth timer, coupled to said seventh output and responsive to said second edge detected signal, for asserting a fourth timing signal of the first period at an eighth output;

a coincidence detector, coupled to said sixth output and to said eighth output and responsive to said third timing signal and to said fourth timing signal, for asserting at a ninth output a coincidence signal whenever both said third timing signal and said fourth timing signals are asserted; and a valve driver, coupled to said second output, said fourth output and to said ninth output and responsive to said first timing signal, to said second timing signal and to said coincidence signal, for asserting a valve actuation signal whenever one of said first timing signal, said second timing signal and said coincidence signal, for asserted.

2. A method for actuating a blowdown valve of a cooling tower system having a first water source and a second water source, the method comprising the steps of:

asserting a first quantity signal whenever a first predetermined quantity of water from the first water source is delivered to a cooling tower of the cooling tower system;

asserting a second quantity signal whenever a second predetermined quantity of water from the second water source is delivered to the said cooling tower;

initiating a first timer, responsive to said first quantity signal, to assert a first timing signal for a first predetermined period;

initiating a second timer, responsive to said second quantity signal, to assert a second timing signal for a second predetermined period;

asserting a first timer expired signal upon detecting an expiration of said first timer;

asserting a second timer expired signal upon detecting an expiration of said second timer;

initiating a third timer, responsive to said first timer expired signal, to assert a third timing signal for said second predetermined period;

initiating a fourth timer, responsive to said second timer expired signal, to assert a fourth timing signal for said first predetermined period;

asserting a coincidence signal whenever said first third timing signal and said fourth timing signals are concurrently asserted; and asserting a valve actuation signal whenever any of said first timing signal, said second timing signal or said coincidence signals are asserted.

* * * * *